US006551850B1

(12) United States Patent
Keller et al.

(10) Patent No.: US 6,551,850 B1
(45) Date of Patent: Apr. 22, 2003

(54) OPTICALLY NONLINEAR SEMICONDUCTOR MATERIAL AND A METHOD FOR THE PRODUCTION THEREOF

(75) Inventors: Ursula Keller, Zürich (CH); Uwe Siegner, Braunschweig (DE); Markus Haiml, Zürich (CH)

(73) Assignee: Gigatera AG, Dietikon (CH)

(*) Notice: Subject to any disclaimer, the term of this patent is extended or adjusted under 35 U.S.C. 154(b) by 0 days.

(21) Appl. No.: 09/698,557

(22) Filed: Oct. 27, 2000

Related U.S. Application Data

(63) Continuation-in-part of application No. PCT/CH99/00157, filed on Apr. 20, 1999.

(30) Foreign Application Priority Data

Apr. 30, 1998 (CH) .................................................. 982/98

(51) Int. Cl.⁷ .............................................. H01L 21/00
(52) U.S. Cl. .............................. 438/45; 438/22; 438/34
(58) Field of Search ............................. 438/22, 34, 45

(56) References Cited

U.S. PATENT DOCUMENTS 5,471,948 A * 12/1995 Burroughes et al. ........ 117/105
5,900,624 A * 5/1999 Verghese et al. ............ 250/214

FOREIGN PATENT DOCUMENTS

| EP | 0 541 304 A1 | 5/1993 |
| JP | 7-36064 | 7/1995 |

OTHER PUBLICATIONS

R. Takahashi et al., XP–002109073, Ultrafast 1.55–µm photoresponses in low–temperature–grown inGaAS/InAlAs quantum wells, 1994 American Institute of Physics, pp. 1790–1792.

S.S. Prabhu et al., XP–002109074, Ultrafast carrier dynamics and optical nonlinearities of low–temperature–grown multiple quantum wells, SPIE vol. 3277, pp. 244–254.

Specht et al., Defect control in As–rich GaAs, 19th International Conference of Defects in Semiconductors, ICDS 19, Jul. 1997, XP002109194, pp. 951–956.

S.U. Dankowski et al., Above band gap absorption spectra of the arsenic antisite defect in low temperature grown GaAs and AlGaAs, XP–002109075, Jan. 1996, pp. 37–39.

G.R. Jacobovitz–Veselka and U. Keller, Broadband fast semiconductor saturable absorber, XP 000334839, 2412 Optics Letters 17 (1992) Dec. 15, No. 24, New York, NY, US, pp. 1791–1793.

E.S. Harmon et al., Carrier lifetime versus anneal in low temperature growth GaAs, XP–002109195, Appl. Phys. Lett. 63 (16) Oct. 18, 1993, 1993 American Institute of Physics, pp. 2248–2250.

(List continued on next page.)

Primary Examiner—Amir Zarabian
Assistant Examiner—Jeff Vockerodt
(74) Attorney, Agent, or Firm—Rankin, Hill, Porter & Clark LLP

(57) ABSTRACT

Essentially non-linear optical material characteristics of a semiconductor material grown at low temperatures can be significantly improved by the following measures: Doping with foreign atoms and/or additional thermal annealing. If, for example GaAs grown at 300° C. is doped with Be to a concentration of $3 \cdot 10^{19}$ cm$^{-3}$, then the response time is reduced from 480 fs (curve 1.1) to 110 fs (curve 3.1), without the absorption modulation being reduced by this or the non-saturable absorption losses being increased. Semiconductor materials, during the production of which at least one of the above measures was implemented, manifest influenceable, in particular short response times as well as simultaneously high absorption modulations and low non-saturable absorption losses. For this reason, they are eminently suitable for non-linear optical applications, such as optical information processing, optical communication or ultrashort laser pulse physics.

11 Claims, 5 Drawing Sheets

OTHER PUBLICATIONS

M.J. Lederer et al., GaAs based anti-resonant Fabry–Perot saturable absorber fabricated by metal organic vapor phase epitaxy and ion implantation, Appl. Phys. Lett. 70 (25) Jun. 23, 1997, 1997 American Institute of Physics, pp. 3428–3430.

M.R. Melloch et al., Low–Temperature Grown III–V Materials, School of Electrical Engineering and the MRSEC for Technology–Enabling Heterostructure Materials, Purdue University, West Lafayette, Indiana, 47907–1285, pp. 547–599.

S.S. Prabhu et al., Ultrafast carrier dynamics and optical nonlinearities of low–temperature–grown multiple quantum wells, SPIE vol. 3277, pp. 244–254.

D.N. Talwar et al., Infrared Studies of Be–Doped GaAs Grown by Molecular Beam Epitaxy at Low Temperatures, Journal of Electronic Materials, vol. 22, No. 12, 1993, pp. 1445–1447.

E.S. Harman et al., Carrier lifetime versus anneal in low temperature growth GaAs, Appl. Phys. Lett 63 (16), Oct. 18, 1993, pp. 2248–2250.

P.W. Juodawlkis et al., Ultrafast carrier dynamics and optical nonlinearities of low–temperature–grown InGaAs/InAlAs multiple quantum wells, Appl. Phys. Lett. 69 (26) Dec. 23, 1996, pp. 4062–4064.

K.A. McIntosh et al., Investigation of ultrashort photocarrier relaxation times in low–temperature–grown GaAs, Appl. Phys. Lett. 70 (3) Jan. 20, 1997, pp. 354–356.

A.J. Lochtefeld et al., The role of point defects and arsenic precipitates in carrier trapping and recombination in low–temperature grown GaAs, Appl. Phys. Lett. 69 (10) Sep. 2, 1996, pp. 1465–1467.

Li Qian et al., Subpicosecond carrier lifetime in beryllium–doped InGaAsP grown by He–plasma–assisted molecular beam epitaxy, Appl. Phys. Lett 71 (11) Sep. 15, 1997, pp. 1513–1515.

S. Gupta et al., Subpicosecond carrier lifetime in GaAs grown by molecular beam epitaxy at low temperatures, Appl. Phys. Lett 59 (25) Dec. 16, 1991, pp. 3276–3278.

R. Takahashi et al., Ultrafast 1.55 $\mu$m all–optical switching using low–temperature–grown multiple quantum wells, Appl. Phys. Lett. 68 (2) Jan. 8, 1996, pp. 153–155.

P.W. E Smith et al., Tailoring of trap–related carrier dynamics in low–temperature–grown GaAs, Appl. Phys. Lett. 71 (9), Sep. 1, 1997, pp. 1156–1158.

* cited by examiner

OPTICALLY NONLINEAR SEMICONDUCTOR MATERIAL AND A METHOD FOR THE PRODUCTION THEREOF

CROSS REFERENCE TO RELATED APPLICATIONS

The present application is a continuation in part of International Application PCT/CH99/00157 filed Apr. 20, 1999.

BACKGROUND OF THE INVENTION

The invention concerns an optically nonlinear semiconductor material, a method for the production thereof, and its use.

Optically nonlinear materials are utilized in many applications today. In the optical information processing, they are, e.g., utilized for switching light by means of light. In the optical communication field, they can serve to clean signals from interfering noise, which is caused, for example, by amplified spontaneous emission (ASE). A further field of application is laser physics, where materials like this are utilized as saturable absorbers for passive mode locking in laser resonators for the purpose of generating ultrashort laser pulses (in the femto- or picosecond range). The passive mode locking, for example, can be achieved by the utilization of a mirror with saturable absorbers made of semiconductor materials (semiconductor saturable absorber mirror, SESAM) as resonator mirror (refer to. U. Keller et al., "Semiconductor Saturable Absorber Mirrors (SESAM's) for Femtosecond to Nanosecond Pulse Generation in Solid-State Lasers", IEEE Journal of Selected Topics in Quantum Electronics, volume 2, No. 3, September 1996). The reflectivity of a SESAM mirror of this type is higher at high light intensities because of absorption bleaching. A SESAM typically consists of a reflecting substrate, a saturable semiconductor absorber structure and, optionally, of an additional reflection or anti-reflection layer.

In applications such as the ones above (apart from others), the material characteristics (a) response time, (b) absorption modulation and (c) non-saturable absorption losses play an essential role and therefore can be designated as key parameters. The following demands are made of these key parameters of optically nonlinear materials:

(a) the response time should be adaptable to the corresponding application (for example, should lie in the pico- or femto-second range);

(b) the absorption modulation should be high;

(c) the non-saturable absorption losses should be low.

Up until now, no material is known, which simultaneously fulfills all these requirements in an ideal manner. In practice, the goal is to find a material, which fulfills the requirements as well as possible. Frequently a measure for the improvement of one key parameter leads to a deterioration of a different key parameter. If the occasion arises, therefore for a certain application a not completely satisfactory, but acceptable compromise between partially opposing material characteristics has to be reached.

By the term "response time", in this document that time is understood, during which the initially rapid change of the optical material characteristics recovers mainly by charge carrier trapping (trapping). Apart from this, the optical material characteristics are also influenced by further, in most instances slower mechanisms.

Mentioned here as an example for a known optically nonlinear material shall be gallium arsenide (GaAs). The preferred method for the production of GaAs is the molecular beam epitaxy (MBE). Normally GaAs is grown at temperatures between 500 and 800° C. This normal growth provides almost ideal stoichiometric crystals with high absorption modulations, low non-saturable absorption losses, but long response times (in the region of 100 ps).

In order to eliminate the disadvantage of long response times, the GaAs can also be grown at low temperatures of approx. 180 to 500° C. With this low temperature process, non-stoichiometric crystals with a high crystal defect density are produced. The crystal defect density and therefore also the low temperature process can be determined or identified with the help of the near infrared absorption (NIRA) or the magnetic circular dichroism of absorption (MCDA) (refer to, e.g., X. Liu et al., "Mechanism responsible for the semi-insulating properties of low-temperature-grown GaAs", Appl. Phys. Lett. 65 (23), Dec. 5, 1994, page 3002 ff.). In actual fact, with the low temperature process one achieves adjustable, short response times (in the range of sub-pico-seconds up to several 10 ps); these advantages, however, have to be paid for by a low absorption modulation and high non-saturable absorption losses.

SUMMARY OF THE INVENTION

It is the objective of the invention to create an optically nonlinear semiconductor material, which simultaneously has influenceable response times, high absorption modulations and low non-saturable absorption losses. It is furthermore the objective of the invention to indicate a method for the production of such a material.

The objective is achieved by the material in accordance with the invention and by the method in accordance with the invention, as these are defined in the independent claims.

Surprisingly it was established, that the key parameters (a)–(c) mentioned above of an optically nonlinear semiconductor material grown at low temperatures, such as, e.g., GaAs, can be significantly improved, i.e., by up to one order of magnitude, by means of the following measures:

(i) the addition of foreign atoms (doping) and/or (ii) additional thermal annealing.

Semiconductor materials, during the production of which at least one of these measures was undertaken, combine astonishingly favorable nonlinear optical material characteristics and in this way come close to an optimization of the key parameters in a manner not achieved up until now. They have in particular (a) influenceable response times, as well as simultaneously (b) high absorption modulations (comparable with those of normally grown semiconductor materials) and (c) low non-saturable absorption losses (comparable with those of normally grown semiconductor materials).

For this reason, they are eminently suitable for nonlinear optical applications, in particular in the optical information processing field for the ultrafast switching of light by means of light, in the optical communication field for the cleaning optical signals from noise or in ultrashort pulse laser physics as saturable absorbers for lasers emitting ultrashort pulses. In the latter field of application, the semiconductor material in accordance with the invention is especially suitable for mirrors with at least one saturable absorber made of this semiconductor material.

Utilized as semiconductor material is in preference a III-V semiconductor, for example gallium arsenide (GaAs), indium-gallium arsenide (InGaAs), aluminium-gallium arsenide (AlGaAs) or indium-gallium arsenide-phosphide (InGaAsP). The semiconductor material is preferably produced by means of molecular beam epitaxy (MBE). Another possible production method is the gas phase deposition, in particular the metalorganic chemical vapor deposition (MOCVD).

In the case of a first method variant in accordance with the invention, a semiconductor material is produced at temperatures between 180 and 500° C. and doped with foreign atoms. The foreign atoms in preference are at least one acceptor material, for example, beryllium (Be). The doping in preference takes place during the epitaxial growth of the semiconductor material in an ultra-high-vacuum chamber in the molecular beam. The foreign atom concentration is adjusted through the ratio of the molecular beam flow, for example, from Be to Ga and As. A doping of this kind can be identified subsequently, e.g., by means of the secondary ion mass spectroscopy (SIMS). Typical Be concentrations are between $10^{17}$ cm$^{-3}$ and $10^{20}$ cm$^{-3}$.

In the case of a second method variant in accordance with the invention, the semiconductor material is produced at temperatures between 180 and 500° C. and subsequently thermally annealed. The annealing can take place during a minimum of 5 minutes at temperatures between 400 and 800° C., or else also as rapid thermal annealing (RTA) during, for example. 10 sec at approx. 600 to 1000° C. The thermal annealing in most instances leads to a certain precipitation of a semiconductor component; in the case of GaAs, for example, small As balls with diameters in the nanometer range are formed, typically between 2 and 10 nm, with a density of $10^{17}$ to $10^{18}$ cm$^{-3}$. (refer to, e.g., M. R. Melloch et al., "Formation of arsenic precipitates in GaAs buffer layers grown by molecular beam epitaxy at low substrate temperatures, Appl. Phys. Lett. 57 (15), Oct. 8, 1990, page 1531 ff.); also a greater bandwidth of the density, for example from $10^{15}$ to $10^{19}$ cm$^{-3}$, is possible. If it is a III-V semiconductor material containing As, then the thermal annealing in preference takes place in an As atmosphere, in order to prevent a displacement of As out of the semiconductor or to at least reduce it.

The doping with foreign atoms and/or the thermal annealing leads to a significant improvement of the key parameters of the semiconductor material. These measures during the production in accordance with the invention have the effect, that the response times are significantly shorter than in the case of semiconductor materials, which have been produced at low temperatures without doping and without thermal annealing; nonetheless, the absorption modulation remains high and the non-saturable absorption losses low.

The favorable effects of the Be doping and/or of the thermal annealing can be explained by means of the following model (refer to the model for undoped GaAs grown at low temperatures in, e.g., U. Siegner et al., "Ultrafast high-intensity non-linear absorption dynamics in low-temperature grown gallium arsenide", Appl. Phys. Lett. 69 (17), Oct. 21, 1996, page 2566 ff.). The non-saturable absorption losses are attributed to a transition between neutral antisites (for example, $AS_{Ga}^0$) in the semiconductor material (for example, GaAs) and the band conditions, which are 0.7 eV above the lower end of the conductive band. Because of the high neutral antisite concentration and the high density of the final conditions, this transition can only be saturated at very high pulse fluences. The Be doping in accordance with the invention, resp., the thermal annealing in accordance with the invention now considerably reduce the concentration of the neutral antisites by changing the charge condition of the defects, resp., by precipitation. As a result of this, the transition between the neutral antisites and the conduction band can be at least partially saturated, which leads to the reduction of the non-saturable absorption losses and to an increase of the absorption modulation.

BRIEF DESCRIPTION OF THE DRAWINGS

In the following, the invention is explained in detail with reference to the drawings. The examples illustrated refer to GaAs; the invention, however, does not only concern this semiconductor material, but also other semiconductor materials. Illustrated are.

DETAILED DESCRIPTION OF THE PREFERRED EMBODIMENTS

Figure 1:
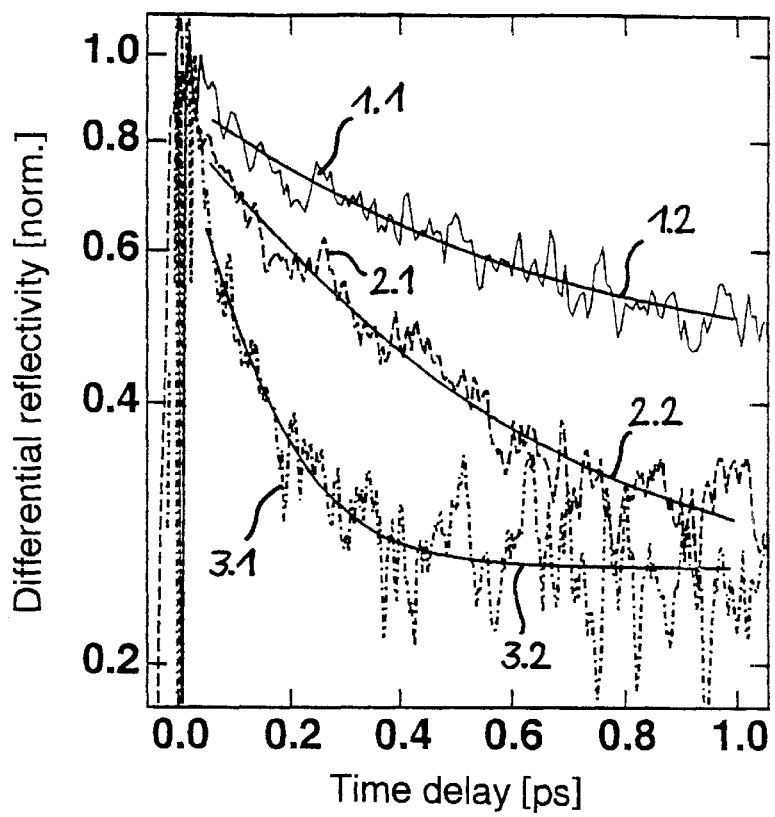
FIG. 1 the measured normalized differential reflectivity in function of the time delay of a probe pulse to a short pump pulse for GaAs with different Be concentrations, FIG. 2 the measured normalized differential reflectivity in function of the time delay of a probe pulse to a short pump pulse for thermally annealed and not annealed GaAs, FIG. 3 the measured normalized differential reflectivity in function of the time delay of a probe pulse to a long pump pulse for GaAs produced with different methods, FIG. 4 measured absorption modulations in function of the growth temperature for GaAs with different Be concentrations, FIG. 5 measured absorption modulations in function of the growth temperature for thermally annealed and not annealed GaAs, FIG. 6 measured non-saturable absorption losses in function of the growth temperature for GaAs with different Be concentrations, FIG. 7 measured non-saturable absorption losses in function of the growth temperature for thermally annealed and not annealed GaAs, FIG. 8 the measured reflectivity in function of the pulse fluence for GaAs with different Be concentrations and FIG. 9 a schematic cross section through a preferred embodiment of a mirror with saturable absorbers made out of semiconductor materials in accordance with the invention.

FIG. 1 illustrates the measured normalized differential reflectivity in function of the time delay of a probe pulse to a short pump pulse with a pulse length of 15 fs and a central wavelength of 750 nm. The measuring curves refer to GaAs grown at 300° C. with different Be concentrations, namely:

Curve 1.1: undoped GaAs,

Curve 2.1: GaAs with a Be concentration of $1 \cdot 10^{19}$ cm$^{-3}$ and

Curve 3.1: GaAs with a Be concentration of $3 \cdot 10^{19}$ cm$^{-3}$.

The curves 1.2, 2.2, resp., 3.2 concern fitted curves (fits) for the corresponding measured values 1.1, 2.1, resp., 3.1, whereby for the fit calculation the function $$a+b(\exp(-t/\tau))$$

was utilized. The time constants τ calculated in this manner reduce from 480 fs through 390 fs to 110 fs for the increasing Be concentrations. This measurement therefore impressively demonstrates the influenceability of the response time by the Be concentration.

Figure 2:
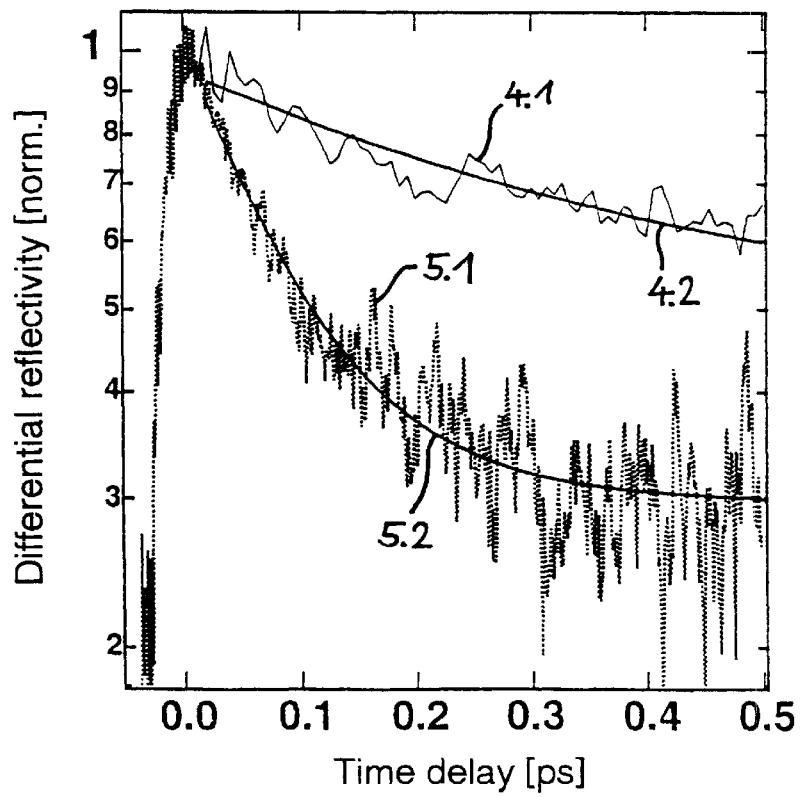

In FIG. 2, the same measurement for the same probe pulse as in FIG. 1 is shown, however, for undoped GaAs grown at 300° C. Curve 4.1 illustrates measuring values for not thermally annealed GaAs, curve 5.1 measuring values for GaAs, which after being grown was thermally annealed for one hour at 600° C. Curves 4.2, resp., 5.2 are for the corresponding fits. FIG. 2 proves, that the response time is also influenceable by thermal annealing in the case of the method in accordance with the invention.

Figure 3:
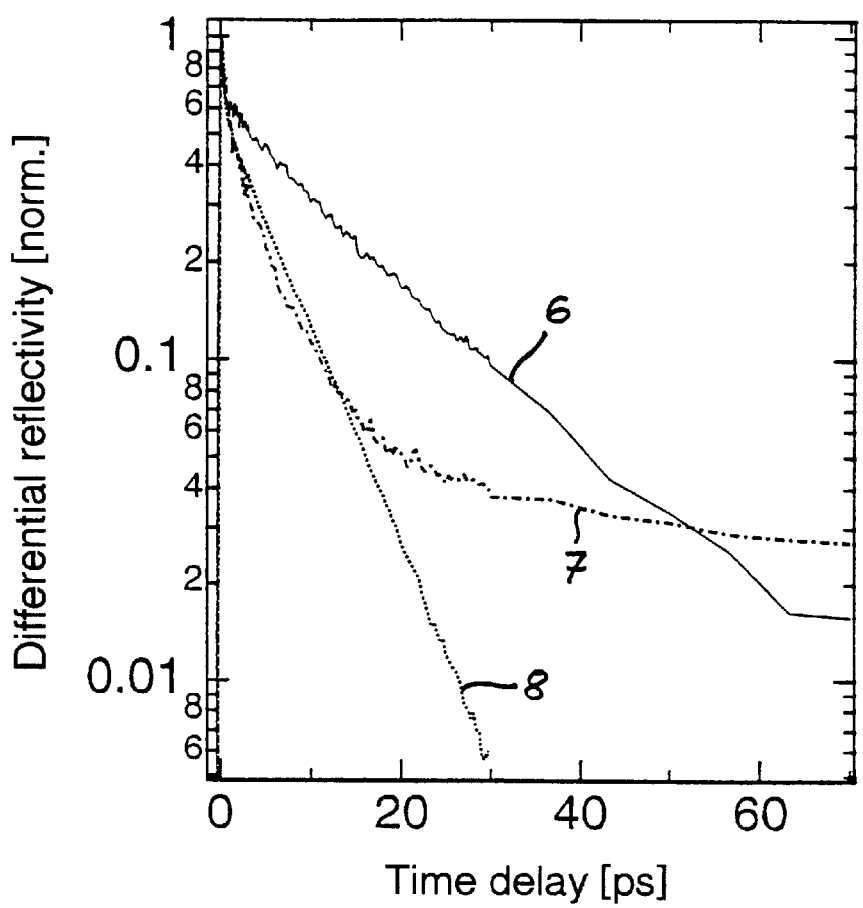

FIG. 3 illustrates the measured standardized differential reflectivity in function of the time delay of a test pulse to a long pumping pulse with a pulse length of 100 fs and a central wavelength of 830 nm. The measuring curves refer to GaAs grown at 300° C., which was produced as follows:

curve 6: undoped, not thermally annealed GaAs, curve 7: not thermally annealed GaAs with a Be concentration of $3 \cdot 10^{19}$ cm$^{-3}$ and curve 8: undoped GaAs thermally annealed for one hour at 600° C.

According to these measurements, the response times can be influenced with the method in accordance with the invention, which comprises the doping and/or thermal annealing.

Figure 4:
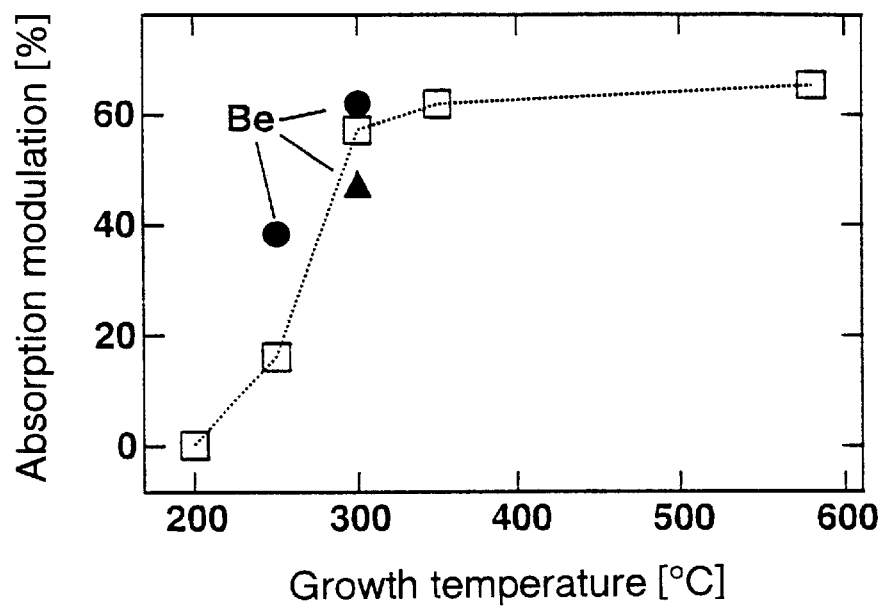

FIG. 4 illustrates measured absorption modulations in function of the growth temperature for GaAs with different Be concentrations. In it, the following signify:

unfilled squares: undoped GaAs, filled circles: GaAs with a Be concentration of $1 \cdot 10^{19}$ cm$^{-3}$ and filled triangle: GaAs with a Be concentration of $3 \cdot 10^{19}$ cm$^{-3}$.

The measurements for undoped GaAs (unfilled squares) confirm the known fact, that GaAs grown at high temperatures($\geq$approx. 300° C.) manifests satisfactorily high absorption modulations (around approx. 60% but depending on the absorber thickness), GaAs grown at low temperatures (<approx. 300° C.), however, not. The astonishing statement of FIG. 4 is, that the Be doping does not reduce the absorption modulation (refer to. 300° C.), but even increases it rather more (refer to. 250° C.). In this it has to be observed, that the response times in Be doped material are much shorter. Undoped GaAs grown at low temperatures with comparable response times would have to be grown at approx. 200° C., as a result of which the absorption modulation is significantly reduced and the non-saturable absorption losses become significantly greater.

Figure 5:
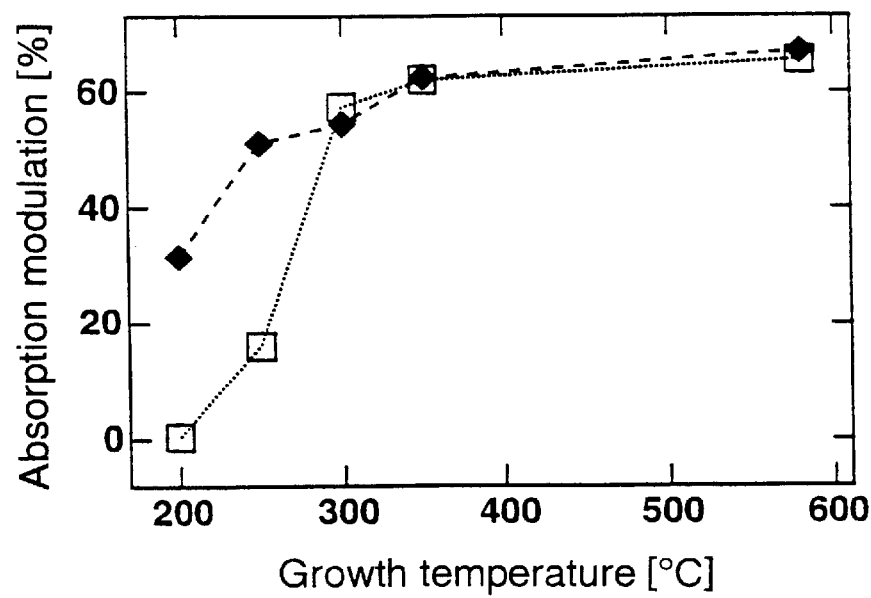

The measurements of FIG. 5 are analogous to those of FIG. 4, however, for undoped GaAs, whereby the following signify:

unfilled squares: not thermally annealed GaAs and filled lozenges: GaAs thermally annealed for one hour at 600° C.

Applicable here too is that the thermal annealing in accordance with the invention does not reduce the absorption modulation (cf 300–600° C.), but rather more even increases it (cf 200–250° C.).

Figure 6:
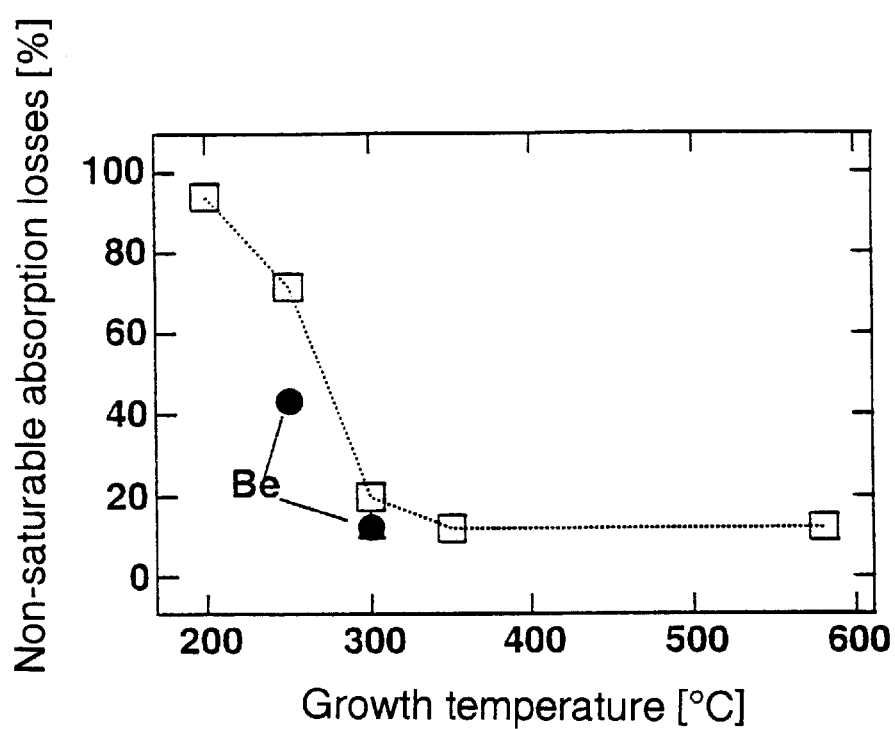

FIG. 6 shows measured non-saturable absorption losses in function of the growth temperature for GaAs with different Be concentrations, whereby the same Be concentrations and symbols are used as in FIG. 4. The measurements for undoped GaAs (unfilled squares) confirm the known fact, that GaAs grown at high temperatures($\geq$approx. 300° C.) manifests satisfactorily low non-saturable absorption losses (around approx. 10%), GaAs grown at low temperatures (<approx. 300° C.), however, not. The astonishing statement of FIG. 6 is, that the Be doping does not increase the non-saturable absorption losses, but even rather more reduces them.

Figure 7:
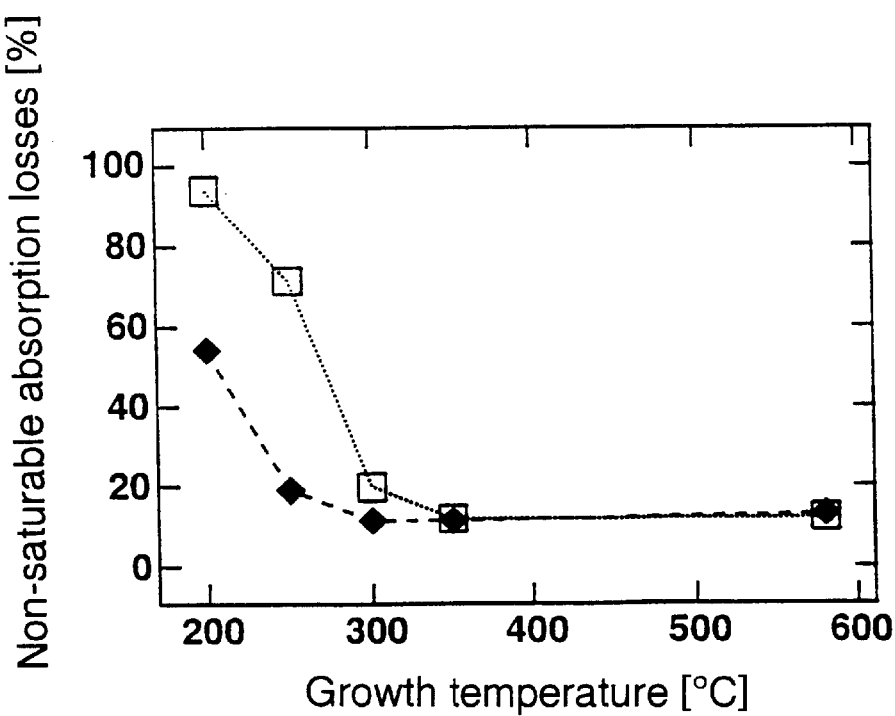

The measurements of FIG. 7 are analogous to those of FIG. 6, however, for undoped GaAs, whereby the same thermal annealing conditions and symbols are used as in FIG. 5. Applicable here too is that the thermal annealing in accordance with the invention does not increase the non-saturable absorption losses, but rather more even reduces them.

Figure 8:
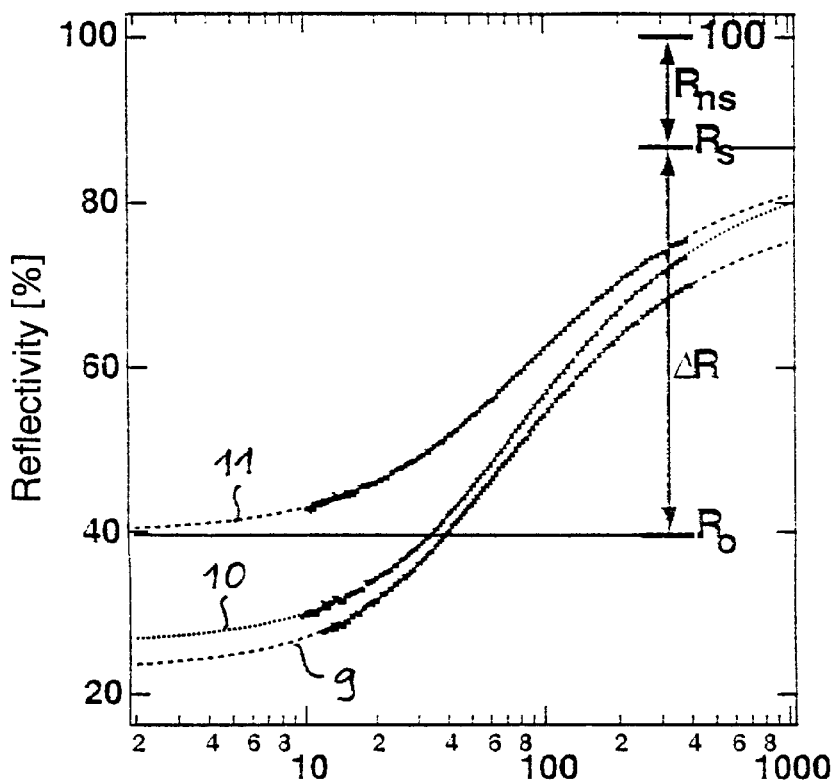

FIG. 8 illustrates the measured reflectivity in function of the pulse fluence for GaAs with different Be concentrations, namely:

curve 9: undoped GaAs, curve 10: GaAs with a Be concentration of $1 \cdot 10^{19}$ cm$^{-3}$ and curve 11: GaAs with a Be concentration of $3 \cdot 10^{19}$ cm$^{-3}$.

On the basis of curve 11, different ranges of the pulse fluence are discussed. For low pulse fluences (<approx. 1 $\mu$J/cm$^2$) the GaAs behaves in an optically linear manner, i.e., the reflectivity has a constant value $R_0$=approx. 40%. As from approx. 1 $\mu$J/cm$^2$, nonlinear optical effects begin to play a role; the reflectivity can be varied by a maximum of one absorption modulation delta R=approx. 45%, independent of the pulse fluence. In the case of high pulse fluences (>approx. 1000 $\mu$J/cm$^2$), a saturation of approx. $R_s$=approx. 85% takes place. The non-saturable absorption losses are calculated in accordance with $R_{ns}$=100%–$R_s$=approx. 15%.

Figure 9:
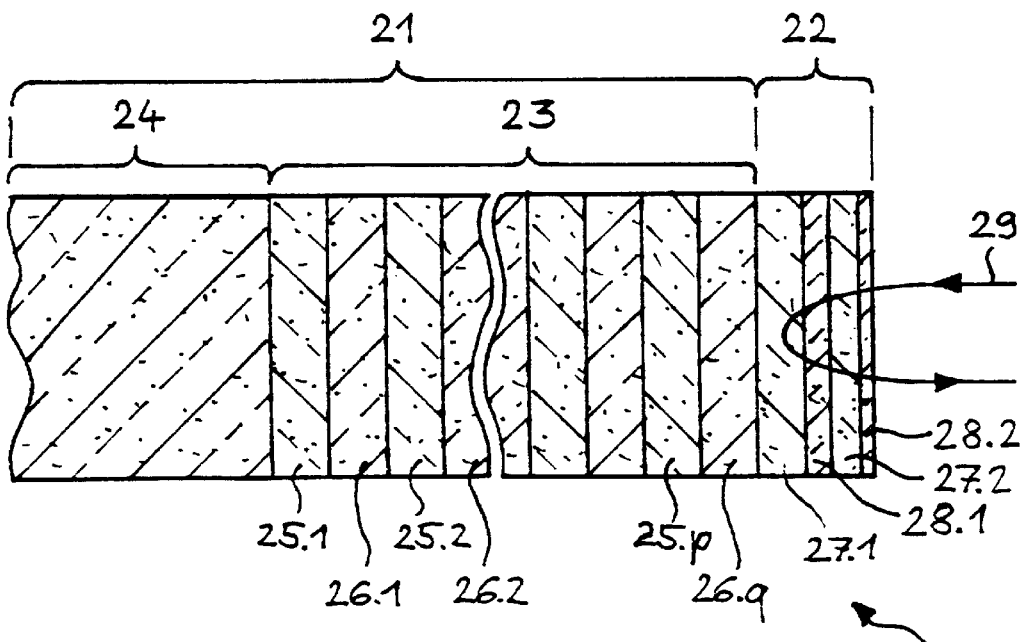

Illustrated schematically in cross section in FIG. 9 is a preferred embodiment of a mirror 20 with saturable absorbers made of semiconductor material in accordance with the invention. In it, for reasons of a clear depiction, the thicknesses of individual elements are not necessarily in a correct ratio to one another. The mirror 20 consists of a reflecting substrate 21 and a saturable semiconductor absorber structure 22. Optionally, on the saturable semiconductor absorber structure 22 additional reflective or anti-reflective layers (not shown) could be applied.

The reflecting substrate 21 in preference is a carrier substrate 24 equipped with a Bragg structure 23, for example, made of GaAs. The Bragg structure 23 is preferably designed as a stack of quarter wave layers 25.1, . . . , 25.p resp., 26.1, . . . , 26.q made of semiconductor materials and/or dielectric materials, whereby layers 25.1, . . . , 25.p with low refractive indexes alternate with layers 26.1, . . . , 26.q with high refractive indexes; typically applicable is p=approx. q=approx. 25. The quarter wave layers consist of, for example AlAs 25.1, . . . , 25.p (n=2.99 at lambda=835 nm), resp., of undoped, not thermally annealed GaAs 26.1, . . . , 26.q (n=3.65 at lambda=835 nm). The saturable semiconductor absorber structure 22 of the exemplary embodiment of FIG. 9 consists of:

a first AlAs-layer 27.1 with a thickness of 75 nm, a first nonlinear optical GaAs layer 28.1 with a thickness of 15 nm produced in accordance with the method according to the invention, a second AlAs layer 27.2 with a thickness of 15 nm and a second nonlinear optical GaAs layer 28.2 with a thickness of 5 nm produced in accordance with the method according to the invention.

A mirror 20 of this kind has high reflectivities of approx. $R \geq 0.99$ (slightly dependent on the impinging light power). Schematically illustrated, as an arrow, is a light beam reflected at the mirror 20.

It goes without saying, that with knowledge of the invention presented here it is possible for the specialist to design further mirrors with saturable absorbers in accordance with the invention.

What is claimed is:

1. A method of fabricating a semiconductor motor device comprising a saturable absorber for mode-locking pulse generating lasers comprising the steps of:

provide a substrate;

growing, on top of said substrate, a layer configuration comprising a semiconductor saturable absorber structure, said semiconductor saturable absorber structure comprising a layer of a semiconductor material which is produced at temperatures between 180° C. and 500° C. and, in a next step, is doped in a specific manner with foreign atoms, whereby at least one of an increase in modulation depth and of the reduction of non-saturable losses at a predefined response time is achieved; and wherein the structure and the substrate are such that the semiconductor mirror device is reflecting for electromagnetic radiation.

2. The method in accordance with claim 1, wherein the semiconductor material is doped with at least one acceptor material.

3. The method in accordance with claim 2, wherein as acceptor material beryllium (Be) is selected.

4. The method in accordance with claim 1, wherein a III-V semiconductor is selected as semiconductor material.

5. The method in accordance with claim 1, wherein the semiconductor material is produced by means of molecular beam epitaxy (MBE).

6. The method in accordance with claim 1, wherein a III-V or II-VI semiconductor is selected as semiconductor material.

7. The method in accordance with claim 6, wherein the semiconductor material is selected from the group containing gallium arsenide (GaAs), indium-gallium arsenide (InGaAs), aluminum-gallium arsenide (AlGaAs) and indium-gallium arsenide-phosphide (InGaAsP).

8. A method of fabricating a semiconductor mirror device comprising a saturable absorber for mode-locking pulse generating lasers, comprising the steps of:

providing a substrate; and growing, on top of said substrate, a layer configuration comprising a semiconductor saturable absorber structure, said semiconductor saturable absorber structure comprising a layer of a semiconductor material which is produced at temperatures between 180° C. and 500° C. and, in a next step, is specifically thermally annealed whereby at least one of an increase in modulation depth and of the reduction of non-saturable losses at a predefined response time is achieved; and wherein the structure and the substrate are such that the semiconductor mirror device is reflecting for electromagnetic radiation.

9. The method in accordance with claim 8, wherein the thermal annealing takes place during a minimum of 5 minutes at temperatures between 400 and 800° C.

10. The method in accordance with claim 8, wherein the thermal annealing takes place during a maximum of one minute at temperatures between 600 and 1000° C.

11. The method in accordance with claim 8, wherein the thermal annealing takes place during a minimum of 10 minutes at temperatures between 500° C. and 800° C.

* * * * *

UNITED STATES PATENT AND TRADEMARK OFFICE
CERTIFICATE OF CORRECTION

PATENT NO. : 6,551,850 B1
DATED : April 22, 2003
INVENTOR(S) : Keller et al.

It is certified that error appears in the above-identified patent and that said Letters Patent is hereby corrected as shown below:

Column 7,
Line 2, delete "motor" and insert -- mirror --.

Signed and Sealed this

First Day of July, 2003

JAMES E. ROGAN
*Director of the United States Patent and Trademark Office*